(12) United States Patent
Pillay et al.

(10) Patent No.: US 9,710,122 B1
(45) Date of Patent: Jul. 18, 2017

(54) CUSTOMER SUPPORT INTERFACE

(71) Applicant: Amazon Technologies, Inc., Reno, NV (US)

(72) Inventors: Suvenderan Pillay, Cape Town (ZA); Mahendra Manshi Chheda, Samamish, WA (US); Suraj Kumar Subrun, Cape Town (ZA); Daine Mimico Neale Mamacos, Cape Town (ZA); Cornelle Christiaan Pretorius Janse Van Rensburg, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 13/732,890

(22) Filed: Jan. 2, 2013

(51) Int. Cl.
*G06F 15/177* (2006.01)
*G06F 3/048* (2013.01)
*G06F 3/0482* (2013.01)
*H04L 12/24* (2006.01)
*G06F 11/07* (2006.01)

(52) U.S. Cl.
CPC ............ *G06F 3/048* (2013.01); *G06F 3/0482* (2013.01); *G06F 11/07* (2013.01); *H04L 41/12* (2013.01); *H04L 41/142* (2013.01)

(58) Field of Classification Search
CPC ...... H04L 12/2602; H04L 41/22; H04L 41/12
USPC ......................................... 715/736
See application file for complete search history.

(56) References Cited

U.S. PATENT DOCUMENTS

| | | | |
|---|---|---|---|
| 6,640,244 B1* | 10/2003 | Bowman-Amuah | 709/207 |
| 6,701,459 B2* | 3/2004 | Ramanathan et al. | 714/37 |
| 7,315,826 B1* | 1/2008 | Guheen et al. | 705/7.29 |
| 2002/0178394 A1* | 11/2002 | Bamberger et al. | 714/1 |
| 2004/0088140 A1* | 5/2004 | O'Konski et al. | 702/183 |
| 2004/0088405 A1* | 5/2004 | Aggarwal | 709/224 |
| 2005/0165764 A1* | 7/2005 | Liongosari | 707/3 |
| 2006/0059253 A1* | 3/2006 | Goodman et al. | 709/223 |
| 2006/0271595 A1* | 11/2006 | Davis | G06F 3/04895 |
| 2007/0115860 A1* | 5/2007 | Samele et al. | 370/259 |
| 2010/0094878 A1* | 4/2010 | Soroca et al. | 707/748 |
| 2011/0051920 A1* | 3/2011 | Dashe et al. | 379/265.09 |
| 2012/0066731 A1* | 3/2012 | Vasquez et al. | 725/106 |
| 2013/0007788 A1* | 1/2013 | Levinson et al. | 725/13 |

* cited by examiner

*Primary Examiner* — Joy M Weber
(74) *Attorney, Agent, or Firm* — Thomas | Horstemeyer, LLP

(57) ABSTRACT

Disclosed are various embodiments for an error support application. Error reports are received and correlated with aggregated known errors. Support is initiated as a function of whether the error is caused by a provided infrastructure service or developer functionality.

29 Claims, 10 Drawing Sheets

CUSTOMER SUPPORT INTERFACE

BACKGROUND

Service oriented architectures incentivize developers with efficient and robust access to services with which to implement their functionality. When errors occur, different types of support may be required depending on the root cause of the error.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Architectures such as service oriented architectures allow for service providers to make various functionalities available to developers. These services entice developers to create applications and other functionalities within the service oriented architecture. This architecture also creates a robust and flexible development environment. Additionally, this creates a dependency on the provided services for the third-party application. When errors occur in the third-party application, the root cause of the error may be in the application, the services, the underlying hardware facilitating the execution of the application or services, or another cause.

Because the root cause may exist in either an application or a service, the service provider may also provide various levels of support to the developer depending on the root cause of the error. For example, if the root cause of an error is due to a problem in a provided service, the service provider may provide complementary or expedited support to remedy the problem. If the root cause of the error is in a third-party application, the service provider may also provide complementary or expedited support if the third-party has a service contract, or when some other criteria is met. Furthermore, if the root cause of the error is in a third-party application and the third-party does not have a service contract or some other condition is met, the service provider may provide paid support or some other level of support. Third-parties may comprise developers, customers, or other entities who use infrastructure services of a computing environment to facilitate the execution of deployed content.

In order to efficiently triage errors for support, an error support application allows users such as developers, application users, or other third-parties to submit an error report comprising information relating to experienced errors. Submission of an error report may be initiated by a user after the user experiences the effects of an error. A solicitation to submit an error report may also be communicated to affected users automatically upon detection of an error. The information may comprise a natural language description of the experienced error. The information may also comprise a selection from a list of known errors and their associated symptoms. The information may also comprise a selection from a list of symptoms from which a diagnosis is derived. The information may also comprise other data. The error support application may then determine, as a function of the provided error report, if the experienced errors are caused by known errors within the services or by an error in the third-party application. Appropriate support can then be provided to remedy the root cause.

In the following discussion, a general description of the system and its components is provided, followed by a discussion of the operation of the same.

Figure 1:
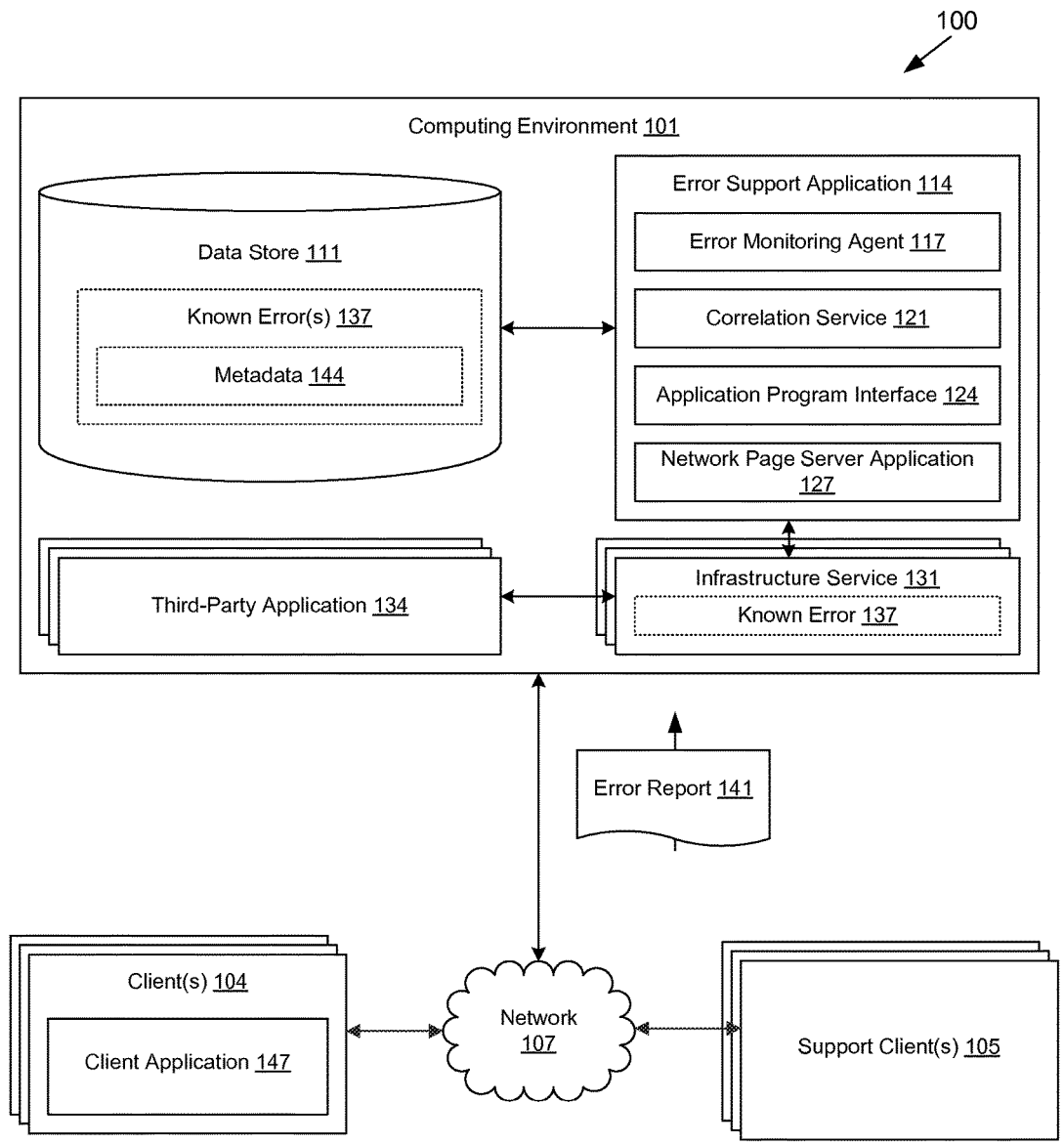
FIG. 1 is a drawing of a networked environment according to various embodiments of the present disclosure.

With reference to FIG. 1, shown is a networked environment 100 according to various embodiments. The networked environment 100 includes a computing environment 101, a client 104, and a support client 105, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an error support application 114 comprising an error monitoring agent 117, a correlation service 121, an application program interface 124, a network page server application 127, and possibly other components or modules. Also executed in the computing environment 101 are infrastructure services 131, and third-party application 134. Additionally, other applications, services, processes, systems, engines, or functionality not discussed in detail herein may also be executed in the computing environment 101.

The error support application 114 is executed to facilitate the diagnosis of errors reported by a client 104. The error monitoring agent 117 monitors infrastructure services 131, third-party applications 134, and potentially other services or functionality executed in the computing environment 101. When the error monitoring agent 117 discovers an error in the infrastructure services 131, third-party applications 134, or other executed functionality, the error support application 114 maintains a record of the error as a known error 137. Additionally, the error monitoring agent 117 updates the record of known errors 137 to remove known errors 137 no longer occurring. Known errors 137 may also be reported by the third-party application 134, the infrastructure services 131, or by other functionality.

In some embodiments, after known errors 137 have been reported by the error monitoring agent 117, the third-party application 134, the infrastructure services 131, or by other functionality, the error support application 114 may automatically communicate a solicitation to submit an error report 141 to clients 104 affected by the known error 137. The solicitation may be communicated by email, short messaging service (SMS), a notification encoded in a network page such as a dashboard user interface, or by another approach. In some embodiments, the solicitation may comprise a link or other navigation element which, when triggered, initiates the communication of an error report. The link or other navigation element may comprise a uniform resource locator (URL) embodying data or metadata associated with the known error 137, the client 104, or other data. Additionally, the data embodied in the URL may be encrypted or transformed by some other approach.

Errors may include bugs, unanticipated or unwanted performance, failure to allocate, reallocate, or free computational resources, stalling or locking of executed functionality, or other events related to the execution of infrastructure services 131 or third-party applications 134. Errors may also comprise an error, fault, or failure in the underlying hardware implemented to facilitate the execution of infrastructure services 131 or third-party applications 134. It is understood that when errors or known errors 137 are referred to as being associated with an infrastructure service 131 or third-party application 134, it is understood that the associated error may comprise an error in the functionality of the infrastructure service 131 or third-party application 134, or may comprise an error in the underlying hardware.

The error support application 114 executes a correlation service 121 to determine the root cause of an error embodied in an error report 141. Correlation may include determining an association of the functionality associated with the error report 141 and known errors 137. This may include determining if the associated functionality accessed data on hardware experiencing problems, if network traffic is routed through failing routers or hardware, if an associated data center is having power management difficulties, or other issues. Correlation may be accomplished by applying a matching algorithm to an obtained error report 141, known errors 137, metadata 144 of the known error 137, or other data. A matching algorithm may comprise weighing symptoms of an error embodied in an error report 141. Correlating the error report 141 to known errors 137 may also comprise applying a k-nearest or other machine learning algorithm to the error report 141. Correlation algorithms may also comprise an assisted machine learning algorithm or another approach.

In embodiments in which a correlation service 121 employs a matching algorithm to match error reports 141 to known errors 137, the correlation service 121 may also access a data set of known errors 137 and associated metadata to train the matching algorithm. Training data may comprise previously experienced known errors 137, associated symptoms, natural language descriptions of known errors 137 or symptoms gathered from client 104 submissions, natural language descriptions aggregated from knowledge bases such as support forums, or other data.

The error support application 114 may obtain these error reports 141 from the network 107 through a variety of approaches. The error support application 114 may expose an application program interface 124 to clients 104 in order to facilitate the communication of error reports 141. The error support application 114 may also expose the application program interface 124 to the third-party application 134 or infrastructure services 131 to facilitate an automatic submission of the error report 141 by the functionality experiencing an error. The error support application 114 may also execute a network page server application 127 to serve network pages such as web pages to a client 104. The network pages may embody a user interface or other approach to facilitate the communication of error reports 141.

In some embodiments, an error report 141 is obtained by being automatically generated responsive to user of a client 104 interacting with a navigation element embodying data or metadata associated with the client 104, the known error 137, or other data. For example, an error report 141 may be generated responsive to a user of a client 104 clicking a URL encoded with encrypted data associated with the client 104 and the known error 137 after the client 104 obtains an automatically communicated solicitation to initiate a support action for the known error 137. Other approaches may also be used by the error support application 114 to obtain error reports 141.

Error reports 141 comprise data accessible to the error support application 114 in order to determine the root cause of an error, such as a known error 137 associated with an infrastructure service 131, third-party application 134, or another cause. Error reports 141 may comprise a natural language description of symptoms occurring in the computing environment 101 that are observed by the client 104. Error reports 141 may also comprise selections from a list of encountered symptoms used by the correlation service 121 to match the error report 141 with a known error 137. Error reports 141 may also comprise a selection of a known error 137 from a list of known errors 137. Other data may also be included in an error report 141 such as metadata associated with the accessed third-party application 134, device-state or other information associated with the client 104, or other data.

In some embodiments, metadata associated with the error report 141 may include known start times in which a known error 137 manifested itself in the computing environment 101. Additional metadata such as affected or defective computing resources associated with the root cause may also be included in the error report 141. Examples of such computing resources may include hardware components, network or connectivity components, power system components, executed functionality, machine instances, or other resources. Additional metadata may include affected regions, availability zones, servers, or other components of a data center architecture facilitating operations of the computing environment 101. The metadata facilitates generating unique fingerprints for the known errors 137 to facilitate identification of affected infrastructure services 131, third-party applications 134, clients 104, and other affected entities. The fingerprints of known errors 137 may also facilitate support actions or other actions.

In some embodiments, data or metadata included in an error report 141 may be stored in a data store 111 or another queryable reference which is accessible by application program interfaces 124 to facilitate support actions to resolve the associated known error 137.

After determining whether a root cause of an error report 141 is a known error 137, the error support application 114 may initiate support to remedy the root cause. If the root cause is a known error 137 associated with an infrastructure service 131, the error support application 114 may initiate a free or expedited support, or another type of support. If the root cause is a known error 137 associated with a third-party application 134, the error support application 114 may initiate paid or another type of support. The type of support initiated by the error support application 114 may be a function of a service contract associated with a client 104 associated with a third-party application 134. For example, if the root cause of an error report 141 is an error in third-party application 134, the error support application 114 may initiate paid support if the client 104 does not have a support contract, and free support if the client 104 does have a support contract. Other actions may also be taken as a function of a support contract associated with a client 104.

Initiating support may comprise creating or modifying a ticket in a support management system, communicating a notification to an entity such as a technician or support representative to remedy the root cause of the error, or another approach. Creating or modifying tickets in a support management system may also include a reference or identifier for a known error 137, metadata 144, an error report 141, or other data.

Additionally, initiating support may comprise referring or otherwise associating a support client 105 with the client 104. The support client 105 may represent a party or entity tasked with providing a remedy to the root cause of the submitted error report 141.

In some embodiments, initiating support may comprise automatically executing a predefined sequence or collection of actions defined to remedy the associated known error 137. The actions may be defined in a reference stored in the data store 111 or by another approach. Executing the actions may be facilitated by an exposed application program interface 124 including a web service application program interface 124, or by another approach. In another embodiment in which a support action may comprise actions requiring manual intervention, initiating a support may comprise communicating directions, steps, or other embodiments of remedial actions to a support representative for execution. Initiating a support may also be performed by another approach.

Infrastructure services 131 comprise executed logic or functionality which facilitates the execution of third-party application 134. Non-limiting examples of infrastructure services 131 may comprise virtual machines, file storage systems, firewalls, virtual local area networks, or other functionality. A third-party application 134 comprises applications, logic, services, or other functionality created by or associated with a client 104. Examples of third-party application 134 may include web applications, web services, server applications, or other functionality. The third-party application 134 may comprise functionality created by a developer client 104, instances of functionality implemented by the computing environment 101 for access by clients 104, or originate from another source. Third-party application 134 is executed in the computing environment 101 as facilitated by the infrastructure services 131.

The data stored in the data store 111 includes, for example, known errors 137 having metadata 144, and potentially other data. Metadata 144 may comprise symptoms associated with known errors 137, expected performance impacts, an expected resolution time, associated affected services, or other data.

The client 104 and support client 105 are representative of a plurality of client devices that may be coupled to the network 107. The client 104 and support client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 147 and/or other applications. The client application 147 may be executed in a client 104, for example, to access network content served up by the computing environment 101 and/or other servers. The client application 147 may, for example, correspond to a browser, a mobile application, etc. The client application 147 may also comprise functionality to access an application program interface 124 in order to communicate error reports 141 to the error support application 114. The client 104 may be configured to execute applications beyond the client application 147 such as, for example, email applications, social networking applications, and/or other applications.

Next, a general description of the operation of the various components of the networked environment 100 is provided. To begin, the error monitoring agent 117 monitors for errors occurring in infrastructure services 131, third-party applications 134, and other functionality. When the error monitoring agent 117 encounters an error, it tracks the error as a known error 137. Tracking the known error 137 may comprise storing the known error 137 as data in a data store 111 for later retrieval. Tracking the known error 137 may also comprise encoding the known error 137 as data locally available to the error support application 114. Additionally, tracking a known error 137 may also comprise storing or otherwise maintaining metadata 144 associated with the known error 137. Other approaches may also be used to track known errors 137.

Next, in some embodiments, a client 104 encounters an error occurring in the computing environment 101 and associated with client 104 interactions with a third-party application 134. The root cause of the error may be a known error 137 associated with an infrastructure service 131, a known error 137 associated with a third-party application 134, or another error. The client 104 or the third-party application 134 then communicates an error report 141 to the error support monitoring application 114.

In other embodiments, the error support application 114 may automatically communicate a solicitation to a client 104 affected by the known error 137 to submit an error report 141 responsive to the known error 137 being tracked. The solicitation may be communicated via email, SMS, a network page such as a dashboard interface, or another approach. In some embodiments, the solicitation comprises a URL embodying data or metadata associated with the known error 137, the client 104, or other data. The data or metadata embodied in the URL may be encrypted or transformed by some other approach.

Communicating an error report 141 may comprise communicating a natural language description of the encountered error. Communicating the error report may also comprise communicating a selection from a list of symptoms or a list of known errors 137. Communicating the error report may be facilitated by a user interface rendered by a client application 147. The user interface may comprise a network page served by the network page server application 127, a user interface generated by a dedicated client application 147, or another interface. Additionally, communicating the error report 141 may also comprise executing an application program interface 124 call exposed by the error support application 114.

In some embodiments, communicating the error report 141 comprises clicking a URL or other navigation element encoded in a solicitation to submit an error report 141. The error report 141 may then be generated as a function of data or metadata encoded in the URL. Other approaches may also be used to communicate the error report 141.

Next, the correlation service 121 determines whether the root cause of the error report 141 is an infrastructure service 131, a third-party application 134, or another cause as a function of the known errors 137. This may comprise parsing or otherwise analyzing the data embodied in the error report 141. For example, in embodiments in which the error report 141 comprises a natural language description, the correlation service 121 may extract key words or phrases from the natural language description for input into a matching algorithm or another algorithm. Determining whether the root cause of the error report 141 is a known error 137 may also comprise matching a selection of symptoms embodied in the error report 141 to symptoms associated with known errors 137 or metadata 144. Matching symptoms embodied in the error report 141 to known errors 137 may be accomplished through a k-means algorithm, assisted or unassisted machine learning algorithm, or by another approach.

Additionally, a matching algorithm may be implemented as a function of weights assigned to various symptoms. For example, a given symptom might have a weight with respect to a first known error 137 that is higher than a weight with respect to a second known error 137. The weights may be representative of a probability that a given symptom occurs in the event of a given known error 137, or representative of other data or characteristics of the symptom.

In some embodiments, a matching algorithm implemented by the correlation service 121 may be a function of an accuracy score associated with the client 104 who submitted the error report 141. For example, a client 104 who has previously submitted an error report 141 may be assigned a grade or score as a function of the accuracy of their error report 141. Clients 104 who consistently provide accurate error reports 141 will receive higher accuracy scores. Future error reports 141 from the client 104 with a high accuracy score will have the reported symptoms weighted higher with respect to other symptoms or error reports 141 communicated to the error support application 114.

In embodiments in which the error report 141 comprises a selection of a known error from a list of known errors, the correlation service 121 may query the error monitoring agent 117 to determine if the selected known error 137 is still applicable. The correlation service 121 may also match an obtained error report 141 as a function of other received error reports 141 from other clients 104. For example, if previously received error reports 141 matched with a given known error 137 and the symptoms between the previous error reports 141 and the obtained error report 141 overlap, then the obtained error report 141 may be determined to be more likely matching the given known error 137. Other approaches may also be used by the correlation service 121 to determine if the root cause of an error report 141 is a known error 137.

If the root cause of the error report 141 is a known error 137 associated with an infrastructure service 131, the error support application 114 may initiate an expedited or free support to remedy the root cause. Other types of support may also be initiated if the root cause of the error report 141 is a known error 137 associated with an infrastructure service 131. If the root cause of the error report 141 is a known error 137 associated with a third-party application 134, the error support application 114 may initiate a paid support, a support having an associated level or tier distinct from that of support for known errors 137 associated with an infrastructure service 131, or another type of support.

In some embodiments, the correlation service 121 may determine that the error report 141 matches more than one known error 137. For example, in embodiments in which the correlation service 121 applies a matching algorithm to the known errors 137 and the error report 141, multiple known errors 137 may be within a threshold range to determine matching known errors 137. In embodiments in which an error report 141 comprises a selection of a known error 137, the selection may comprise more than one known error 137.

In such embodiments in which the error report 141 matches more than one known error 137, the error support application 114 may initiate a support for all or a subset of the matching known errors 137. For example, the error support application 114 may create a support ticket for one matching known error 137, but include references to the remainder of the matching known errors 137 for future reference. Other approaches may also be used when more than one known error 137 matches the error report 141.

FIGS. 2A-2D represent various levels of detail for a data center architecture 200 according to various embodiments. The various components of the data center architecture 200 described in FIG. 2A-2D and their various subcomponents as will be described are representative of various points of failure which may comprise a root cause of a known error 137 (FIG. 1).

Figure 2A:
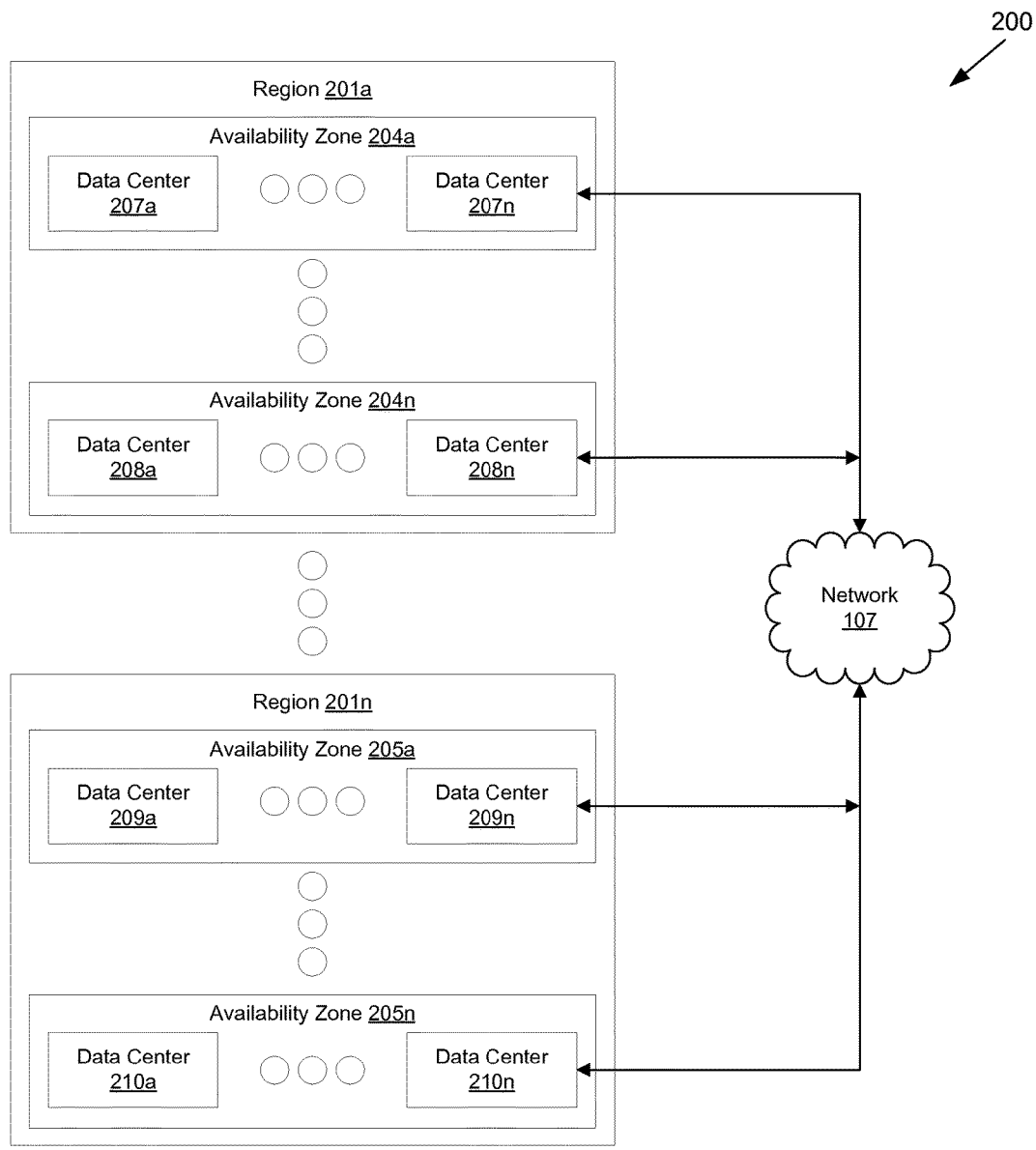
FIG. 2A is a drawing of an example region-level data center architecture according to various embodiments of the present disclosure.

FIG. 2A represents a region-level view of an example data center architecture 200 according to various embodiments. Regions 201a-n are a plurality of logical groupings comprising a plurality of availability zones 204a-n and 205a-n.

Regions 201a-n may be grouped as a function of geography, national boundaries, a logical or graphical topology, or some other approach. For example, regions 201a-n may be grouped by geographical areas of the United States, such as the southeast, the midwest, the northeast, or other geographical areas. Other approaches may also be used to define regions 201a-n.

Each region 201a-n comprises one or more availability zones 204a-n or 205a-n. Each of the availability zones 204a-n or 205a-n are logical groupings comprising one or more data centers 207a-n, 208a-n, 209a-n, and 210a-n. Availability zones 204a-n or 205a-n are defined to be insulated from failures in other availability zones 204a-n or 205a-n, and to optimize latency costs associated with connectivity to other availability zones 204a-n or 205a-n in the same region 201a-n. For example, distinct availability zones 204a-n or 205a-n may comprise distinct networks, power circuits, generators, or other components. Additionally, in some embodiments, a single data center 207a-n, 208a-n, 209a-n, or 210a-n may comprise multiple availability zones 204a-n or 205a-n. The regions 201a-n are in data communication with each other through a network 107 (FIG. 1).

Figure 2B:
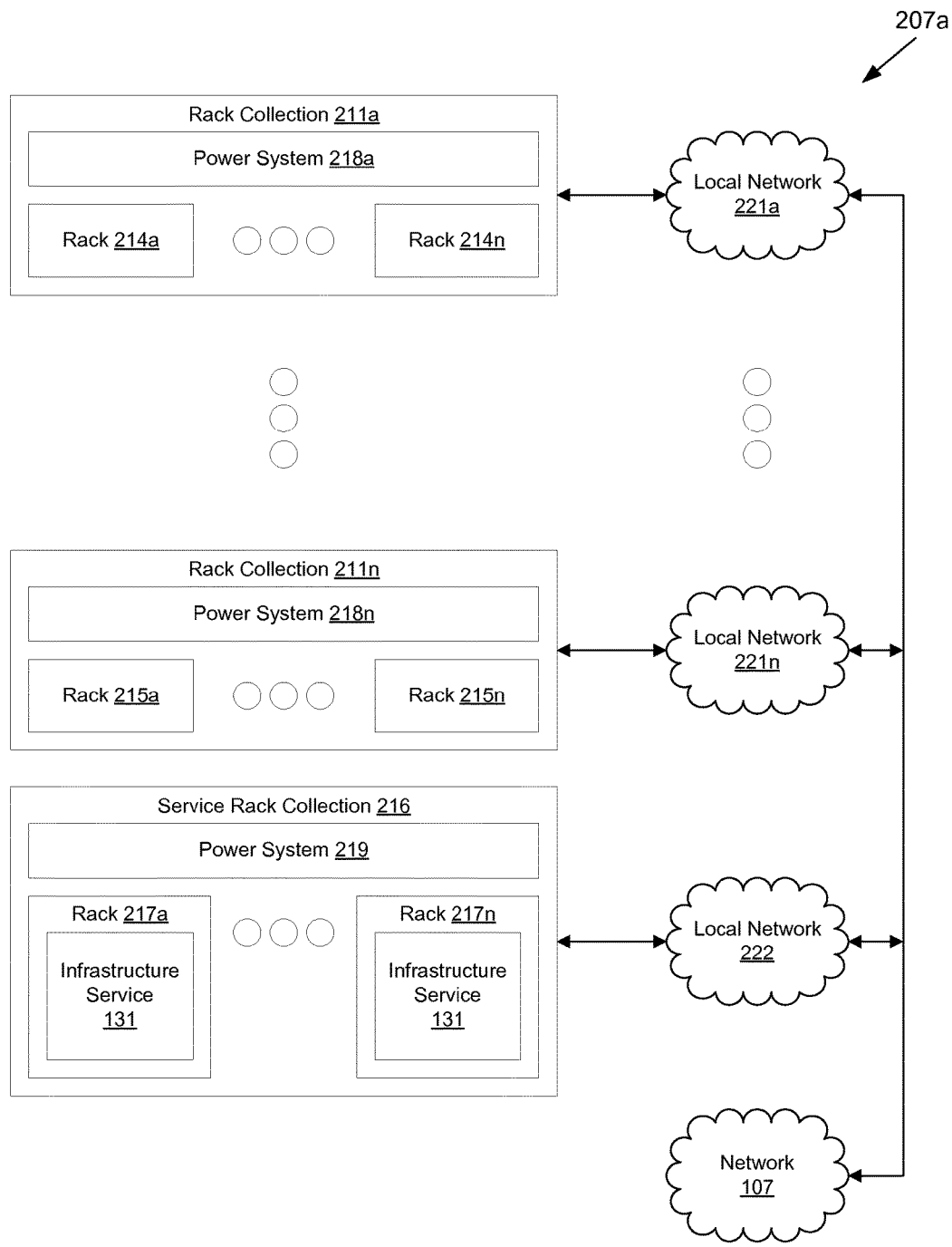
FIG. 2B is a drawing of an example data center-level data center architecture according to various embodiments of the present disclosure.

FIG. 2B depicts a data center-level view of an example data center architecture 200. The data center-level view may be representative of an architecture implemented in data center 207a-n, 208a-n, 209a-n, or 210a-n. Data center 207a comprises at least one rack collection 211a-n, and each rack collection 211a-n comprises a corresponding at least one rack 214a-n or 215a-n. The data center 207a may also comprise at least one service rack collection 216 comprising racks 217a-n to facilitate the implementation of infrastructure services 131 (FIG. 1). Although the infrastructure services 131 are depicted as executing on a dedicated server rack collection 216, the infrastructure services 131 may also be executed in the rack collections 211a-n.

Each rack collection 211a-n or 216 also comprises at least one power system 218a-n or 219 to which the corresponding grouping or racks 214a-n, 215a-n, or 218a-n are connected. Power systems 218a-n or 219 may comprise cabling, switches, batteries, uninterrupted power supplies, generators, or other components implemented to facilitate the powering of racks 214a-n, 215a-n, or 218a-n.

Each rack collection 211a-n or 216 is coupled to a local network 221a-n or 222. The local networks 221a-n or 222 are implemented to facilitate data communications between the components of the corresponding rack collection 211a-n. The local networks 221a-n or 222 may also facilitate data communications between the corresponding rack collection 211a-n or 216 and the network 107.

Figure 2C:
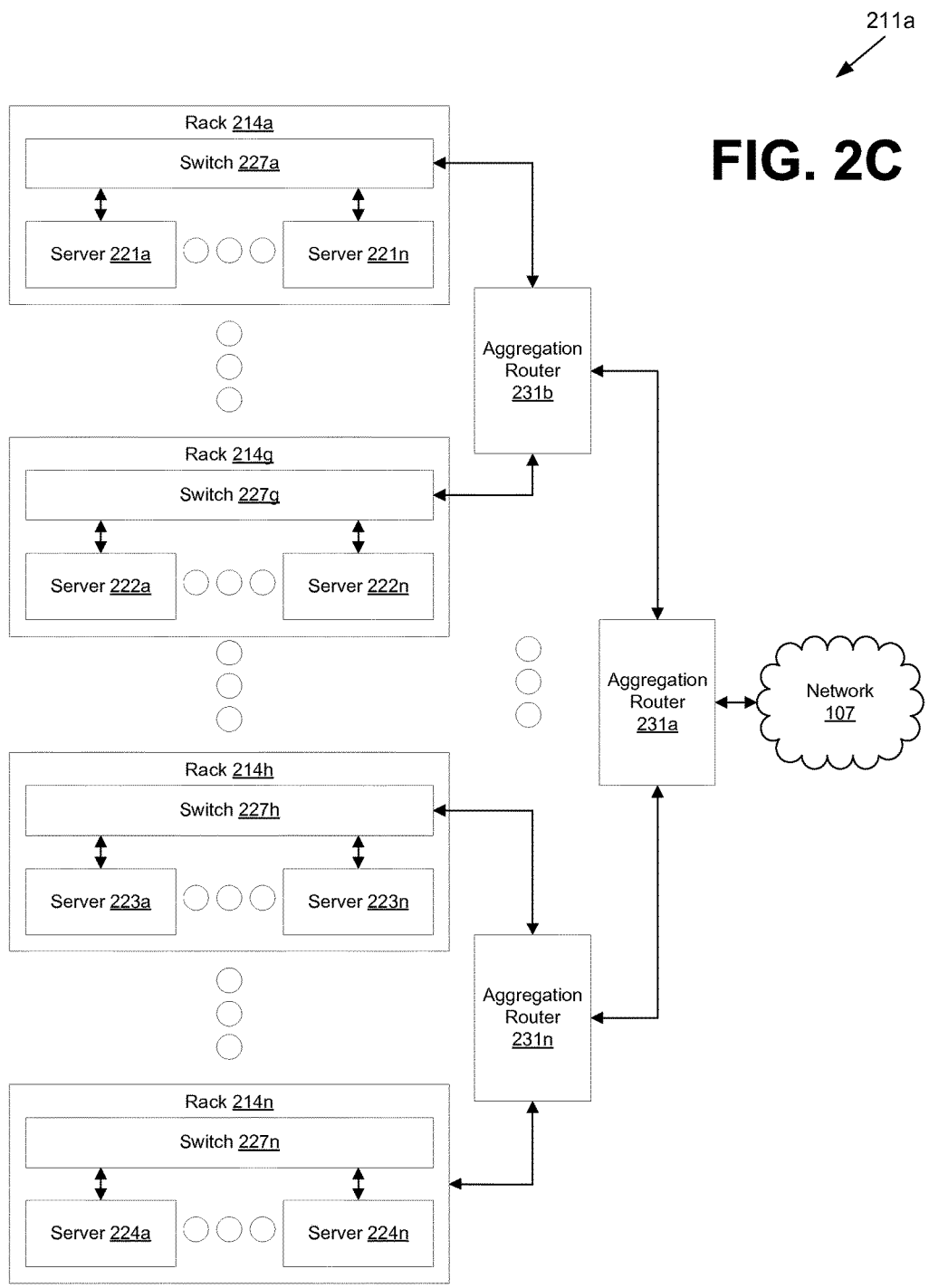
FIG. 2C is a drawing of an example rack-level data center architecture according to various embodiments of the present disclosure.

FIG. 2C depicts a rack collection-level implementation of a data center architecture 200 according to various embodiments. The rack collection-level implementation may be representative of a rack collection 211a-n or 216. For example, the rack collection 211a comprises a plurality of racks 214a-n, subdivided into subsets of racks 214a-g and racks 214h-n. Each rack 214a-n comprises a plurality of servers 221a-n, 222a-n, 223a-n, or 224a-n for executing third-party applications 134 (FIG. 1), infrastructure services 131, or other functionality. Each server 221a-n, 222a-n, 223a-n, or 224a-n may comprise shared or distinct hardware configurations. Each of the racks 214a-n also comprises at least one switch 227a-n to which the corresponding servers 221a-n, 222a-n, 223a-n, or 224a-n. The rack collection 221a also comprises a hierarchy of aggregation routers 231a-n. Although FIG. 2C depicts a two-level hierarchy of aggregation routers 231a-n, it is understood that one or more levels of aggregation routers 231a-n may be implemented. The highest level of the aggregation routers 231a-n are in communication with an external network 107 (FIG. 1).

The aggregation routers 231a-n facilitate the routing of network communications to the servers 221a-n, 222a-n, 223a-n, or 224a-n. To this end, each of the switches 227a-n are in data communication with the aggregation routers 231a-n.

Figure 2D:
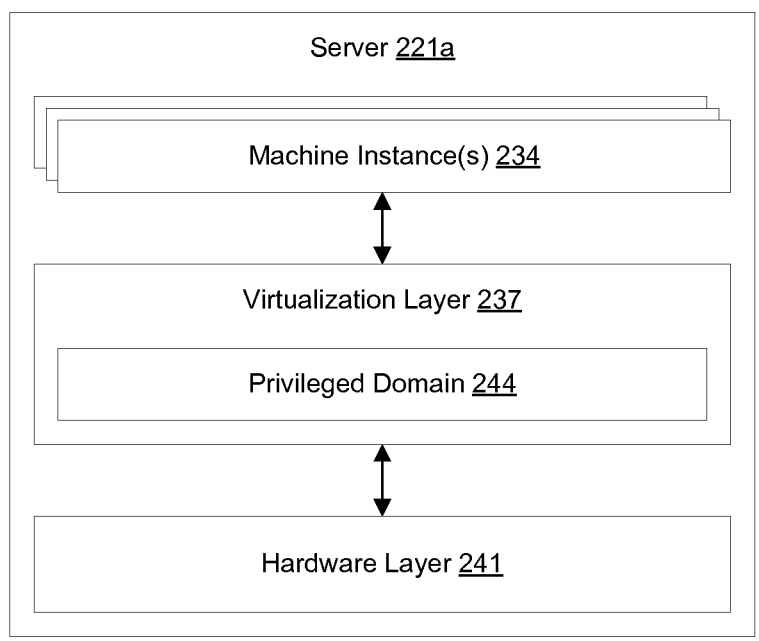
FIG. 2D is a drawing of an example server-level data center architecture according to various embodiments of the present disclosure.

FIG. 2D depicts a server 221a as implemented in a data center architecture 200. Although FIG. 2D is drawn to server 221a, it is understood that FIG. 2D may be representative of any server 221a-n, 222a-n, 223a-n, or 224a-n.

Executed on server 221a are one or more machine instances 234. The machine instance 234 comprises a virtualized instance of an operating system to facilitate the execution of an infrastructure service 131, a third-party application 134, or other functionality. Each machine instance 234 communicates with a virtualization layer 237. The virtualization layer 227 controls access to the hardware layer 231 by each of the executed machine instances 234. The virtualization layer 237 may further comprised a privileged domain 244. The privileged domain 244 may comprise a machine instance 234 with distinct or higher-level user privileges with respect to the other executed machine instances 234 in order to facilitate interactions between machine instances 234, the hardware layer 241, or other components. The privileged domain 244 may also comprise access restrictions, limiting operation of the privileged domain 244 to an authorized subset of users such as a system administrator. The privileged domain 224 may facilitate the creation and management of machine instances 234.

The hardware layer 241 comprises various hardware components implemented to facilitate the operation of machine instances 234 and their associated executed functionality. The hardware layer 241 may comprise network interface cards, network routing components, processors, memories, storage devices, or other components.

Figure 3:
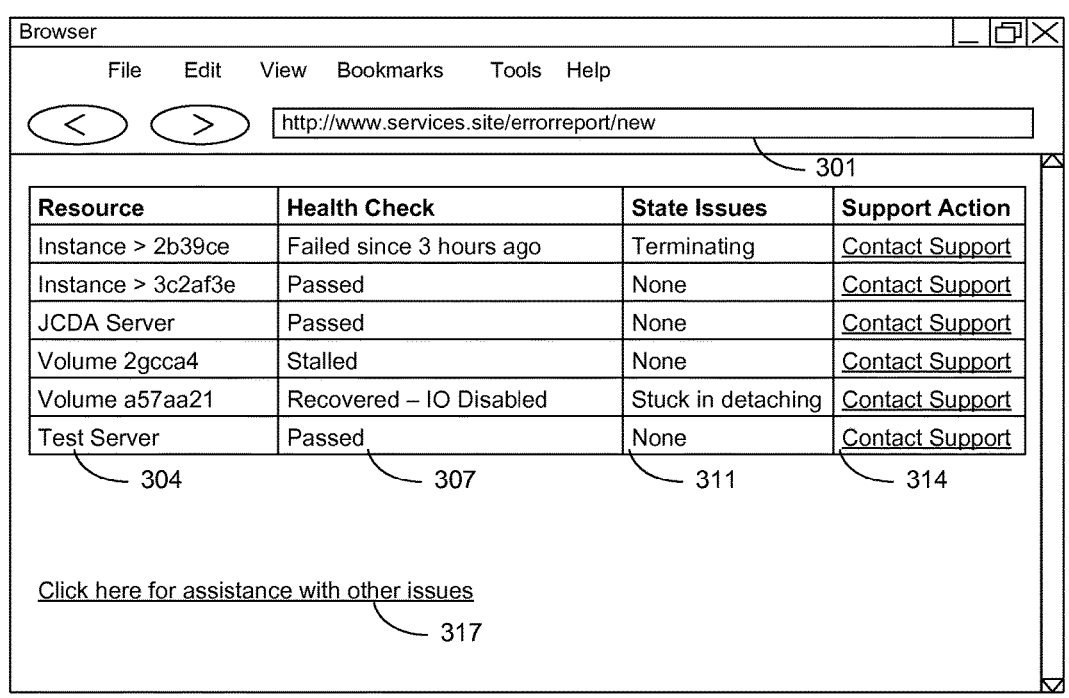
FIG. 3 is a drawing of an example of a user interface rendered by a client in the networked environment of FIG. 1 according to various embodiments of the present disclosure.

Moving on to FIG. 3, shown is a user interface encoded for rendering by the error support application 114 (FIG. 1) to facilitate the communication of an error report 141 (FIG. 1) as a selection from a list of known errors 137 (FIG. 1) to the computing environment 101 (FIG. 1). FIG. 3 may be representative of a network page served by the network page server application 127 (FIG. 1) for rendering on by a browser client application 147 (FIG. 1) executed on a client 104 (FIG. 1). In the alternative, FIG. 3 may be representative of a user interface rendered by a dedicated client application 147. As a further alternative, FIG. 3 may be representative of a solicitation to submit an error report 141 communicated to a client 104.

Item 301 is representative of a uniform resource locator input to the client application 147 in order to connect to a network page server application 127. Item 304 is representative of a listing of infrastructure services 131 (FIG. 1) or other functionality which are experiencing known errors 137. Item 307 is representative of the result of monitoring activity performed by the error monitoring agent 117 (FIG. 1) with respect to each of the infrastructure services 131. Item 311 is representative of symptoms or other issues known to be caused by the known errors 137 in order to inform a client 104 selection of one of the known errors.

Item 314 is representative of a link corresponding to each of the known errors which, when selected, communicates an error report 141 to the error support application 114 as a selection of the known error 137. In some embodiments, the links comprise URLs embodying data or metadata associated with the corresponding known error 137, the client 104, or other data. Additionally, in some embodiments, clicking the link may trigger an automatic initiation of a support action such as executing predefined actions to remedy the known error 137 or place the corresponding known error 137 in a support queue for remedying by a service representative. In the event that a client 104 cannot find an appropriate known error 137 associated with the error they are experiencing, item 317 is selected in order to submit an error report 141 for another root cause. Selection of item 317 may communicate an error report 141, initiate a rendering of a user interface to input additional data, or perform some other function.

Figure 4:
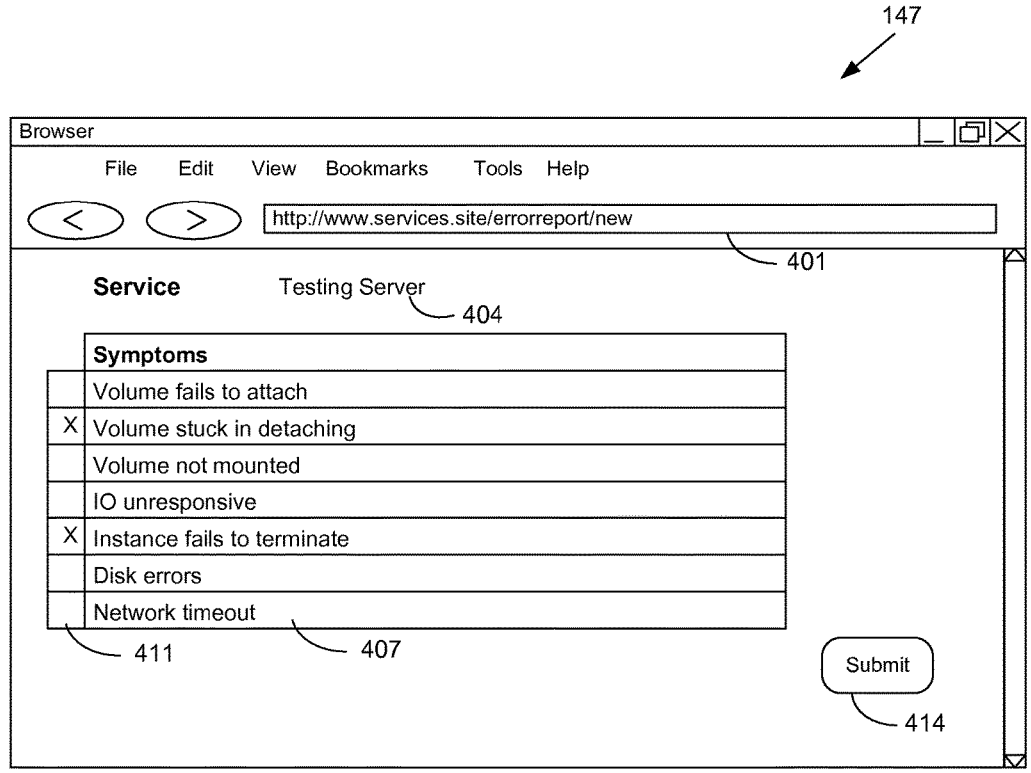
FIG. 4 is a drawing of an example of a user interface rendered by a client in the networked environment of FIG. 1 according to various embodiments of the present disclosure.

Turning now to FIG. 4, shown is a user interface encoded for rendering by the error support application 114 (FIG. 1) to facilitate the communication of an error report 141 (FIG. 1) as a selection of symptoms to the computing environment 101 (FIG. 1). FIG. 4 may be representative of a network page served by the network page server application 127 (FIG. 1) for rendering on by a browser client application 147 (FIG. 1) executed on a client 104 (FIG. 1). In the alternative, FIG. 4 may be representative of a user interface rendered by a dedicated client application 147.

Item 401 is representative of a uniform resource locator input to the client application 147 in order to connect to a network page server application 127. Item 404 is representative of an identifier of functionality with which the client 104 is experiencing difficulty. Item 404 may be an identifier associated with third-party application 134 (FIG. 1), an infrastructure service 131 (FIG. 1), or other functionality.

Item 407 is representative of a list of symptoms which may be associated with at least one known error 137 (FIG. 1). Item 407 comprises natural language descriptions of the symptoms which may be encountered by a client 104. Each description of item 407 has a corresponding item 411 which may be clicked or otherwise selected to generate the selection of symptoms. Item 414 is representative of a button which causes the generation of an error report 141 comprising the selected symptoms embodied in items 407 and 411.

Figure 5:
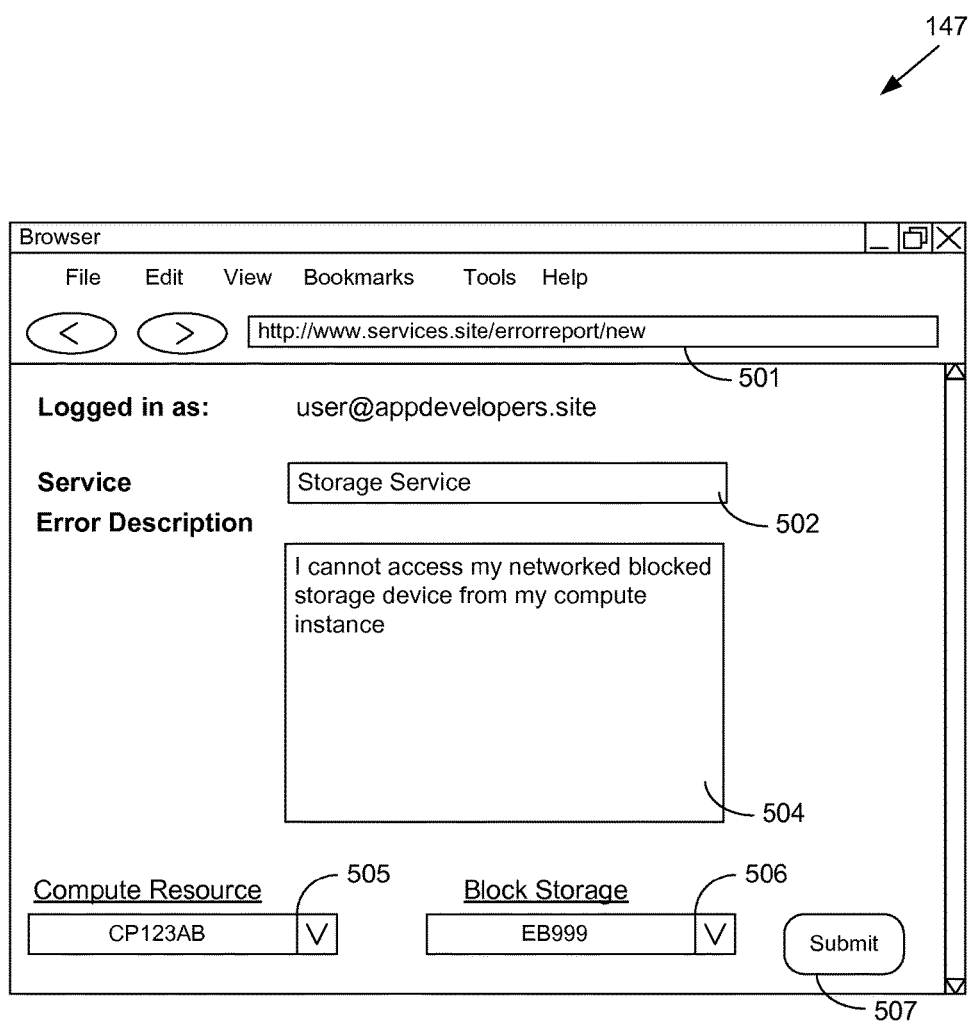
FIG. 5 is a drawing of an example of a user interface rendered by a client in the networked environment of FIG. 1 according to various embodiments of the present disclosure.

Referring next to FIG. 5, shown is a user interface encoded for rendering by the error support application 114 (FIG. 1) to facilitate the communication of an error report 141 (FIG. 1) as a natural language description of symptoms to the computing environment 101 (FIG. 1). FIG. 5 may be representative of a network page served by the network page server application 127 (FIG. 1) for rendering on by a browser client application 147 (FIG. 1) executed on a client 104 (FIG. 1). In the alternative, FIG. 2 may be representative of a user interface rendered by a dedicated client application 147.

Item 501 is representative of a uniform resource locator input to the client application 147 in order to connect to a network page server application 127. Item 502 is representative of an identifier of functionality with which the client 104 is experiencing difficulty. Item 502 may be an identifier associated with third-party application 134 (FIG. 1), an infrastructure service 131 (FIG. 1), or other functionality.

Item 504 is representative of an input for a natural language description of the error experienced by the client 104. The text of the natural language description will be parsed and input into the correlation service 121 (FIG. 1) to determine whether the error is a known error 137 (FIG. 1). Item 505 is a dropdown menu to select an identifier for a compute resource associated with the experienced error. Item 506 is a dropdown menu to select an identifier for a block storage device associated with the experienced error. Items 505 and 506 provide additional data for the error report 141 for correlation to known errors 137 (FIG. 1). Item 507 is representative of a button which, when pressed, causes the input data to be encoded into an error report 141 for communication to the error support application 114.

Figure 6:
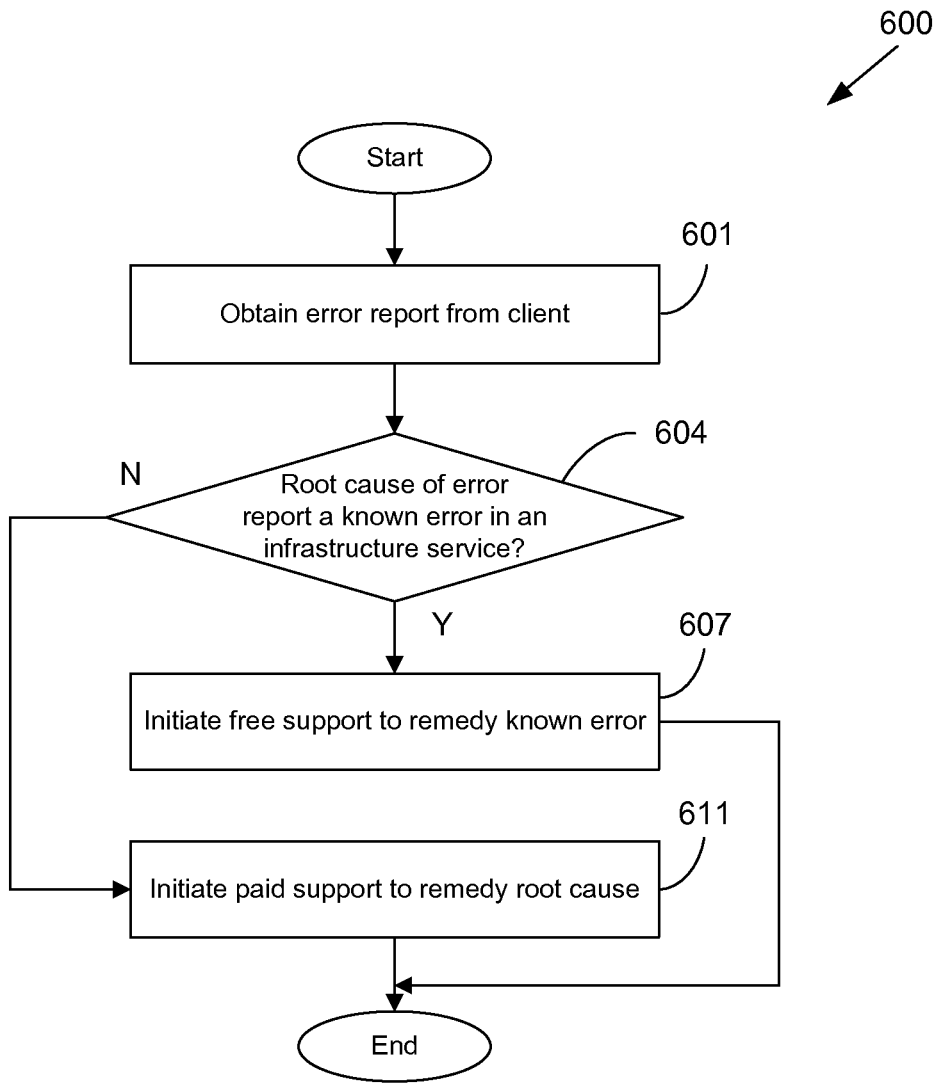
FIG. 6 is a flowchart illustrating one example of functionality implemented as portions of an error support application executed in a computing environment in the networked environment of FIG. 1 according to various embodiments of the present disclosure.

Referring next to FIG. 6, shown is a flowchart that provides one example of the operation 600 of a portion of the error support application 114 (FIG. 1) according to various embodiments. It is understood that the flowchart of FIG. 6 provides merely an example of the many different types of functional arrangements that may be employed to implement the operation of the portion of the error support application 114 as described herein. As an alternative, the flowchart of FIG. 6 may be viewed as depicting an example of steps of a method implemented in the computing environment 101 (FIG. 1) according to one or more embodiments.

Beginning with box 601, the error support application 114 obtains an error report 141 (FIG. 1). The error report 141 may be obtained via the network 107 (FIG. 1) after being encoded by a client application 147, obtained from a third-party application 134 (FIG. 1), or by another approach.

In box 604, the error support application 114 determines if the root cause of the error report 141 is a known error 137 (FIG. 1) associated with an infrastructure service 131 (FIG. 1). In embodiments in which the error report 141 comprises a natural language description of the error, the correlation service 121 (FIG. 1) may parse or otherwise process the description in order to extract keywords or other data to serve as input to a matching algorithm. In embodiments in which the error report 141 comprises a selection from a list of symptoms, the correlation service 121 may input the selection into a matching algorithm.

The matching algorithm may also determine if the root cause of an error report 141 is a known error 137 associated with an infrastructure service 131 as a function of accuracy scores associated with clients 104 (FIG. 1) or other obtained error reports 141. In embodiments in which the error report 141 comprises a list of known errors 137, the error monitoring agent 117 (FIG. 1) may be queried to determine if the selected known error 137 still exists. Other approaches may also be used to determine if the root cause of the error report 141 is a known error 137.

If the root cause of the error report 141 is a known error 137 associated with an infrastructure service 131, the error support application 114 initiates a free support to remedy the known error 137 in box 607. Initiating the free support may comprise creating a ticket in a support management system, communicating a notification to a service representative or technician, or another approach. After initiating the free support, the process ends.

If the root cause of the error report 141 is not a known error 137 associated with an infrastructure service 131, the error support application 114 initiates a paid support to remedy the root cause in box 611. The paid support may be a function of a service contract associated with a client 104, or other data. After initiating the paid support, the process ends.

Figure 7:
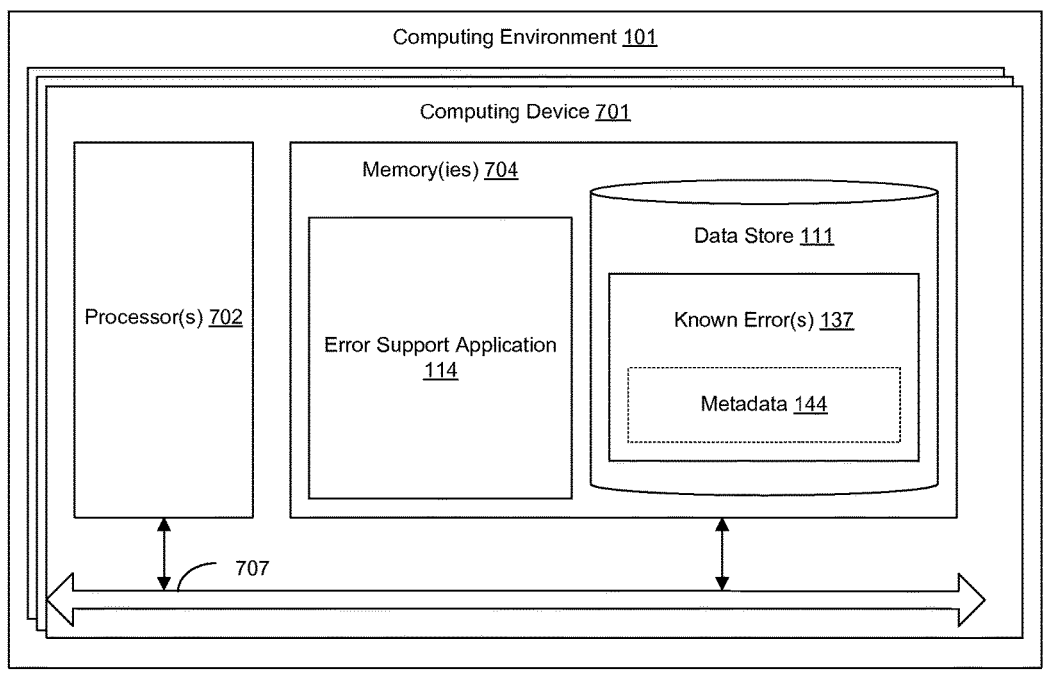
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 101 according to an embodiment of the present disclosure. The computing environment 101 includes one or more computing devices 701. Each computing device 701 includes at least one processor circuit, for example, having a processor 702 and a memory 704, both of which are coupled to a local interface 707. To this end, each computing device 701 may comprise, for example, at least one server computer or like device. The local interface 707 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are an error support application 114 (FIG. 1), and potentially other applications. Also stored in the memory 704 may be a data store 111 (FIG. 1) storing known errors 137 (FIG. 1), metadata 144 (FIG. 1), and other data. In addition, an operating system may be stored in the memory 704 and executable by the processor 702.

It is understood that there may be other applications that are stored in the memory 704 and are executable by the processor 702 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 704 and are executable by the processor 702. In this respect, the term "executable" means a program file that is in a form that can ultimately be run by the processor 702. Examples of executable programs may be, for example, a compiled program that can be translated into machine code in a format that can be loaded into a random access portion of the memory 704 and run by the processor 702, source code that may be expressed in proper format such as object code that is capable of being loaded into a random access portion of the memory 704 and executed by the processor 702, or source code that may be interpreted by another executable program to generate instructions in a random access portion of the memory 704 to be executed by the processor 702, etc. An executable program may be stored in any portion or component of the memory 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 704 is defined herein as including both volatile and nonvolatile memory and data storage components. Volatile components are those that do not retain data values upon loss of power. Nonvolatile components are those that retain data upon a loss of power. Thus, the memory 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 702 may represent multiple processors 702 and/or multiple processor cores and the memory 704 may represent multiple memories 704 that operate in parallel processing circuits, respectively. In such a case, the local interface 707 may be an appropriate network that facilitates communication between any two of the multiple processors 702, between any processor 702 and any of the memories 704, or between any two of the memories 704, etc.

The local interface 707 may comprise additional systems designed to coordinate this communication, including, for example, performing load balancing. The processor 702 may be of electrical or of some other available construction.

Although an error support application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 show the functionality and operation of an implementation of portions of the error support application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 702 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the error support application 114, that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   detecting, by at least one computing device, through an error monitoring agent, an error occurring in a plurality of infrastructure services, wherein the plurality of infrastructure services are executed to support a plurality of third-party applications;
   maintaining, by the at least one computing device, a record of the error as one of a plurality of known errors, the plurality of known errors being associated with a plurality of keywords through an application of a machine learning algorithm;
   providing, by the at least one computing device, an application program interface that defines a plurality of web service calls to facilitate a submission of an error report, the error report being associated with an execution of one of the plurality of third-party applications associated with one of a plurality of clients, the error report comprising a textual description of at least one symptom;
   transmitting, by the at least one computing device, a user interface associated with the application program interface to the one of the plurality of clients, the user interface comprising a list of infrastructure services experiencing one or more known errors; a status list that presents recent results of a health check status monitoring activities towards the list of infrastructure services; a list of symptomatic issues known to be caused by the one or more known errors associated with the list of infrastructure services, and a list of selectable links associated with the list of infrastructure services, wherein an individual selectable link, when selected, initiates communication of the error report for the known error that is associated with a respective infrastructure service contained in the list of infrastructure services to an error support application of the at least one computing device, the error report including an input of the textual description of the at least one symptom by a user;
   obtaining, by the at least one computing device from the one of the plurality of clients, via the application program interface, the error report;
   determining, by the at least one computing device, that a root cause of the error report is included in a subset of the plurality of known errors within the plurality of infrastructure services as a function of an inclusion of the plurality of keywords in the textual description;
   responsive to the root cause being included in the subset of the plurality of known errors within the plurality of infrastructure services, initiating, by the at least one computing device, a first support level to resolve the root cause, wherein the first support level comprises initiating a support ticket in a support management system associated with remedying an error in the plurality of infrastructure services; and
   responsive to the root cause not being included in the subset of the plurality of known errors within the plurality of infrastructure services, initiating, by the at least one computing device, a second support level to resolve the root cause wherein the second support level comprises initiating a support ticket in the support management system associated with remedying an error in the one of the plurality of third-party applications.

2. The method of claim 1, further comprising rendering a user interface to facilitate a communication of the at least one symptom for the error report by the user.

3. The method of claim 1, further comprising exposing the application program interface to the plurality of clients to facilitate a communication of the error report.

4. A system, comprising:
   at least one computing device having a processor and a memory; and
   an error support application executable in the at least one computing device, the error support application configured to at least:
      detect an error occurring in an infrastructure service or a third-party application associated with a client, the infrastructure service executed in the system to support the third-party application;
      maintain a record of the error as one of a plurality of known errors;
      transmit a user interface to the client, the user interface comprising a list of infrastructure services experiencing one or more known errors; a status list that presents recent results of a health check status monitoring activities towards the list of infrastructure services; a list of symptomatic issues known to be caused by the one or more known errors associated with the list of infrastructure services, and a list of selectable links associated with the list of infrastructure services, wherein an individual selectable link, when selected, initiates communication of an error report for the known error that is associated with a respective infrastructure service contained in the list of infrastructure services to the error support application of the at least one computing device, the error report including an input of a textual description of at least one symptom by a user of the client;
      obtain, from the client, the error report relating to an operation of the third-party application associated with the client;
      determine, based at least in part on the error report, whether the error report is associated with at least one of the plurality of known errors;
      in response to the error report being associated with at least one of the plurality of known errors, determine a root cause of the at least one known error as originating in at least one of the third-party application or the infrastructure service;

in response to the error report being associated with at least one of the plurality of known errors associated with the third-party application, initiate a first support action to remedy the at least one of the plurality of known errors by initiating a first support ticket in a support management system associated with remedying an error in the third-party application;

in response to the error report being associated with at least one of the plurality of known errors associated with the infrastructure service, initiate a second support action to remedy the at least one of the plurality of known errors by initiating a second support ticket in the support management system associated with remedying an error in the infrastructure service; and wherein the first or second support action is a function of the root cause.

5. The system of claim 4, wherein the plurality of known errors are aggregated by an error monitoring agent.

6. The system of claim 4, wherein the textual description in the error report comprises a natural language message, the plurality of known errors are associated with a plurality of keywords, and wherein the error support application is further configured to parse the natural language message to determine an associated one of the plurality of known errors as a function of the plurality of keywords.

7. The system of claim 6, wherein the error support application is further configured to associate the plurality of keywords with the plurality of known errors as a function of the textual description of at least one of the plurality of known errors.

8. The system of claim 7, wherein the error support application is further configured to apply a machine learning algorithm to the textual description and the at least one of the plurality of known errors.

9. The system of claim 4, wherein the error support application is further configured to communicate a list of the plurality of known errors to the client, individual ones of the plurality of known errors being associated with at least one symptom in the list of symptomatic issues; and wherein the error report comprises a selection of at least one of the plurality of known errors from the list of the plurality of known errors.

10. The system of claim 9, wherein the error support application is further configured to, after obtaining the error report from the client, increment a counter associated with the at least one of the plurality of known errors included in the selection of the at least one of the plurality of known errors.

11. The system of claim 4, wherein the error report comprises a selection of the list of symptomatic issues from the client.

12. The system of claim 11, wherein symptoms in the list of symptomatic issues are associated with a plurality of weights with respect to the plurality of known errors, and a function of the weights of the symptoms included in the selection of the list of symptomatic issues is used to determine whether the error report is associated with at least one of the plurality of known errors.

13. The system of claim 4, wherein the error support application is further configured to expose an application program interface to the client to facilitate a communication of the error report.

14. The system of claim 4, wherein the error support application is further configured to, in response to the root cause being the infrastructure service, initiate a paid support action to remedy the known error.

15. The system of claim 4, wherein the error support application is further configured to communicate a solicitation to the client to communicate the error report, the error report comprising a reference to the one of the plurality of known errors; and wherein the error report is communicated responsive to a clicking of a uniform resource locator embodied in the solicitation.

16. The system of claim 15, wherein the uniform resource locator comprises encoded metadata associated with at least one of the client or the one of the plurality of known errors.

17. The system of claim 16, wherein the encoded metadata is encrypted.

18. The system of claim 4, wherein the first or second support action comprises an automatic execution of at least one remedial action.

19. The system of claim 4, wherein the first support ticket in the support management system is associated with at least one remedial action to be initiated by a support personnel.

20. A method, comprising:
detecting, in a computing device, an error occurring in an infrastructure service, the infrastructure service facilitating an execution of a third-party application;
maintaining, in the computing device, a record of the error as one of a plurality of known errors;
transmitting, by the computing device to one of a plurality of clients, a user interface comprising a list of infrastructure services experiencing one or more known errors; a status list that presents recent results of a health check status monitoring activities towards the list of infrastructure services; a list of symptomatic issues known to be caused by the one or more known errors associated with the list of infrastructure services, and a list of selectable links associated with the list of infrastructure services, wherein an individual selectable link, when selected, initiates communication of an error report for the known error that is associated with the infrastructure service contained in the list of infrastructure services to an error support application of the computing device, the error report including an input of a textual description of at least one symptom by a user of the one of the plurality of clients;
obtaining, in the computing device, from the one of the plurality of clients, the error report relating to the third-party application associated with the one of the plurality of clients;
determining, in the computing device, a root cause of the error report;
initiating, in the computing device, a first support level if the root cause is included in the known errors, wherein the first support level comprises initiating a first support ticket in a support management system associated with remedying an error in the infrastructure service; and
initiating, in the computing device, a second support level if the root cause is not included in the known errors, wherein the second support level comprises initiating a second support ticket in the support management system associated with remedying an error in the third-party application.

21. The method of claim 20, wherein aggregating, in the computing device, the plurality of known errors is performed by an error monitoring agent.

22. The method of claim 20, wherein the error report comprises a selection of symptoms from the list of symptomatic issues, and determining if the root cause is included in the plurality of known errors is a function of the selection of symptoms.

23. The method of claim 22, wherein determining if the root cause is included in the plurality of known errors further comprises applying a k-nearest algorithm to the selection of symptoms.

24. The method of claim 20, wherein the plurality of known errors are associated with a plurality of keywords, and determining if the root cause is included in the plurality of known errors is a function of an inclusion of the keywords in the textual description.

25. The method of claim 20, wherein the error report comprises a selection from a list of the plurality of known errors.

26. The method of claim 20, wherein the first support level or the second support level comprises associating the one of the plurality of clients with a support entity to remedy the root cause.

27. The method of claim 20, further comprising:
adding, in the computing device, a new known error to the plurality of known errors;
communicating, in the computing device, a solicitation to the one of the plurality of clients to submit the error report;
wherein the solicitation comprises a uniform resource locator embodying metadata associated with the one of the plurality of clients and the new known error; and
wherein an interaction with the uniform resource locator initiates a communication of the error report to the computing device.

28. The method of claim 20, wherein the first support level or the second support level comprises an automatic execution of a predefined sequence of remedial operations.

29. The method of claim 20 wherein the second support level comprises an addition of the second support ticket to a support queue, the second support ticket being associated with a plurality of remedial operations for initiation by a support representative of the third-party application.

* * * * *